United States Patent [19]

Mann et al.

[11] Patent Number: 5,779,758
[45] Date of Patent: *Jul. 14, 1998

[54] METHOD AND APPARATUS FOR FORMING CONTINUOUS GLASS FIBERS

[75] Inventors: Douglas B. Mann. Westerville; Leonard J. Adzima. Pickerington; Martin C. Flautt, Granville, all of Ohio

[73] Assignee: Owens-Corning Fiberglas Technology, Inc., Summit, Ill.

[*] Notice: The term of this patent shall not extend beyond the expiration date of Pat. No. 5,626,643.

[21] Appl. No.: 651,197

[22] Filed: May 17, 1996

Related U.S. Application Data

[63] Continuation of Ser. No. 291,801, Aug. 17, 1994, abandoned.

[51] Int. Cl.⁶ .................. C03B 37/10; C03B 40/02; C03B 25/02
[52] U.S. Cl. ............... 65/443; 65/447; 65/453; 65/475; 65/500; 65/529; 65/533; 65/539; 65/900; 34/343; 34/381; 34/422; 34/624; 34/627; 34/628
[58] Field of Search ............... 65/443, 447, 453, 65/500, 507, 509, 529, 533, 539, 900, 452, 475; 427/389.8; 219/469; 34/343, 381, 422, 611, 613, 623, 624, 627, 628

[56] References Cited

U.S. PATENT DOCUMENTS

| | | |
|---|---|---|
| 2,635,389 | 4/1953 | Toulmin, Jr. . |
| 2,880,552 | 4/1959 | Whitehurst . |
| 3,349,222 | 10/1967 | Johnston . |
| 3,414,711 | 12/1968 | Guyet et al. ............... 219/469 |
| 3,458,890 | 8/1969 | Neal ............... 34/627 X |
| 3,620,701 | 11/1971 | Janetos et al. . |
| 3,717,448 | 2/1973 | Smith ............... 65/529 X |
| 3,718,448 | 2/1973 | Drummond et al. ............... 65/448 |
| 3,865,565 | 2/1975 | Spence et al. ............... 65/443 |
| 3,887,347 | 6/1975 | Reese . |
| 3,890,127 | 6/1975 | Siegmund . |
| 3,905,185 | 9/1975 | Bauer et al. . |
| 3,918,947 | 11/1975 | Maaghul et al. . |
| 3,936,995 | 2/1976 | Schiffer . |
| 3,996,033 | 12/1976 | Chickowski ............... 65/453 X |
| 4,013,435 | 3/1977 | Kane et al. . |
| 4,042,360 | 8/1977 | Kane et al. . |
| 4,193,782 | 3/1980 | Aulich et al. . |
| 4,236,323 | 12/1980 | Dammann et al. . |
| 4,295,871 | 10/1981 | Droux et al. ............... 65/453 X |
| 4,309,202 | 1/1982 | Parbhoo ............... 65/453 |
| 4,440,557 | 4/1984 | Morrison et al. . |
| 4,461,804 | 7/1984 | Motsinger et al. ............... 65/447 X |
| 4,611,410 | 9/1986 | Brossmer ............... 34/623 X |
| 4,853,021 | 8/1989 | Soszka et al. . |
| 4,927,445 | 5/1990 | Soszka et al. . |
| 5,049,407 | 9/1991 | Soszka et al. . |
| 5,055,119 | 10/1991 | Flautt et al. . |
| 5,171,634 | 12/1992 | Soszka et al. . |
| 5,181,947 | 1/1993 | Mizuno et al. . |
| 5,298,576 | 3/1994 | Sumida et al. . |
| 5,443,611 | 8/1995 | Salvador . |
| 5,626,643 | 5/1997 | Woodside et al. ............... 65/443 X |

FOREIGN PATENT DOCUMENTS

| | | |
|---|---|---|
| 0554173 | 1/1993 | European Pat. Off. . |
| 2699156 | 6/1994 | France . |
| 216493 | 12/1984 | Germany . |
| 58-20746 | 2/1983 | Japan . |
| 63-265839 | 11/1988 | Japan . |

*Primary Examiner*—Curtis Mayes
*Attorney, Agent, or Firm*—C. Michael Gegenheimer; Inger H. Eckert

[57] ABSTRACT

An apparatus is provided for producing a glass fiber package. The apparatus includes a heated bushing for supplying streams of molten glass to be drawn into continuous fibers, a rotatable member adapted to draw the streams into fibers and to wind the fibers into a package, an applicator for applying a size to the fibers, and a drying device including a heated element maintained at a temperature of between about 1000° F. and 1500° F. for contacting and transferring energy in the form of heat to the sized fibers to dry the fibers before they are wound into the package. The heating member is stationary while contacting the sized fibers.

21 Claims, 4 Drawing Sheets

METHOD AND APPARATUS FOR FORMING CONTINUOUS GLASS FIBERS

CROSS-REFERENCE TO RELATED APPLICATION

This application is a file wrapper continuation application of U.S. patent application Ser. No. 08/291,801 filed Aug. 17, 1994, now abandoned.

BACKGROUND OF THE INVENTION

The present invention relates generally to continuous glass fiber manufacture and, more particularly, to a method and apparatus for drying sized fibers.

Glass fiber packages are commonly manufactured by supplying molten glass to a bushing, drawing glass fibers from the bushing, and applying a size, usually aqueous based, to the fibers via an applicator roller. The sized fibers are gathered into a strand at a gathering shoe and are wound on a collet to produce a glass fiber package. The glass fiber package is then transferred via a carrier device to a heated enclosure, such as an oven, where water is evaporated from the aqueous based size.

Due to the off-line drying process, a migration problem generally exists in glass fiber packages formed in the aforementioned manner. Migration arises during the drying process as water in the aqueous based size travels toward the outer surface of the package. As the water moves outwardly, it takes with it a portion of the soluble solids, which portion becomes deposited at the outer periphery of the package.

The migration problem has generally been dealt with in the past by simply removing the high solids fibers. However, this solution results in a substantial amount of scrap and, hence, is not cost-effective.

In one prior art application, strands from a number of glass fiber packages are combined to form a gun roving product. The strands are combined only after the packages have been dried and removed from the heated enclosure. After the drying process, the strands are gathered into a single tow which is wound onto a collet to form a roving package. The tow is separable into its individual strands. Each strand, however, is not separable into its individual fibers since the fibers are adhered to one another.

The number of winding steps required to form the roving product—1) winding of the strands to form the first packages, 2) unwinding of the strands to allow the same to be gathered into a tow, and 3) winding of the tow into a roving product—results in the product being fairly expensive to make. A further problem associated with the roving product is unacceptable catenary. Catenary is apparent when a given length of tow is unwound and the individual strands in that tow section are of unequal lengths. A spiral winder, forming a spiral-wound forming package, is commonly used in the aforementioned process and its use is believed to be the cause for unacceptable catenary.

Accordingly, there is a need for an improved sized fiber drying process which results in the reduction or substantial elimination of migration. There is further a need for an improved process for forming a split product which allows it to be produced in a more economical manner and with a reduction in catenary.

SUMMARY OF THE INVENTION

These needs are met by the present invention, whereby an improved sized fiber drying process is provided which substantially reduces migration. The present invention further provides an improved process for producing split products.

In accordance with a first aspect of the present invention, an apparatus is provided for producing a glass fiber package. The apparatus comprises a heated bushing for supplying molten glass to be drawn into continuous fibers; a rotatable member adapted to draw the streams into fibers and to wind the fibers into a package; an applicator for applying a size to the fibers; and, a drying device comprising a heated element maintained at a temperature of between about 1000° F. and 1500° F. for contacting and transferring energy in the form of heat to the sized fibers to dry the fibers before they are wound into the package, wherein the heated member being stationary while contacting the size fibers.

The drying device may comprise a heated contact plate. Preferably, the heated contact plate has a curved outer surface which directly contacts the fibers. The plate may be connected directly to a power source which effects resistance heating of the plate. Alternatively, the plate may be spaced from an energy source, such as a resistance heater, which radiantly heats the plate. It is further contemplated that a source of hot gases may be located adjacent to the plate for convectively heating the plate or a heated surface may be placed in contact with the plate to heat the plate through conduction.

The apparatus preferably comprises first shoes (splitting devices) located between the applicator and the drying device for separating the fibers into two or more bundles. A second shoe may be provided between the drying device and the rotatable member. In one embodiment, the second shoe comprises a gathering shoe for gathering the bundles into a single tow. In another embodiment, the second shoe comprises a separating shoe for separating the fibers into one or more bundles.

In accordance with a second aspect of the present invention, a method is provided for producing a plurality of sized glass fibers. The method comprises the steps of: drawing a plurality of glass fibers from a source of molten glass; applying a size to the fibers; and, contacting the sized fibers with a heated member to dry the size on the fibers.

The method may comprise the step of separating the sized fibers into a plurality of bundles before the fibers contact the heated member.

The size applied to the fibers may comprise an aqueous based size, but other suitable non-aqueous based sizes may be used. For example, the size may comprise water, a film former, a coupling agent, a lubricant, a wetting agent, an antistatic agent and acetic acid. Example film formers comprise polyurethanes and polyvinyl acetates. When an aqueous based size is applied to the fibers, the heated plate serves to evaporate the water from the aqueous based size and coalesces the remaining size ingredients into a film.

In accordance with one embodiment, the film former is selected from the group consisting of a crosslinking vinyl acrylic copolymer emulsion, which is commercially available from Franklin International under the product name Covinax 27A, a vinyl acetate copolymer emulsion, which is commercially available from Franklin International under the product name Duracet 1512, a polyvinyl acetate copolymer latex, which is commercially available from Franklin International under the product name Duracet 675-01, and mixtures thereof.

In accordance with a third aspect of the present invention, a method is provided for producing a glass fiber package having a plurality of separable bundles. The method comprises the steps of: drawing a plurality of glass fibers from a source of molten glass; applying a size to the fibers; separating the sized fibers into a plurality of bundles;

contacting the sized fibers with a heated member to transfer energy in the form of heat from the member to the fibers to dry the size on the fibers; and, winding the individual bundles into a package.

In accordance with a fourth aspect of the present invention, a glass fiber package is provided having a plurality of separable bundles. The glass fiber package is produced by: drawing a plurality of glass fibers from a source of molten glass; applying an aqueous based size to the fibers; separating the sized fibers into a plurality of bundles; contacting the sized fibers with a heated member to dry the size on the fibers; and, winding the individual bundles into a package.

In accordance with a fifth aspect of the present invention, a method is provided for applying size to glass fibers comprising the steps of: applying a size to the fibers and contacting the sized fibers with a heated member to effect drying of the size on the fibers.

It is an object of the present invention to provide an improved apparatus for producing a glass fiber package. It is a further object of the present invention to provide a sized glass drying process. It is another object of the present invention to provide an improved method for producing a glass fiber package. It is yet another object of the present invention to provide an improved glass fiber split product. It is still a further object of the present invention to provide an in-line sized fiber drying process. These and other objects and advantages of the present invention will be apparent from the following description, the accompanying figures, and the appended claims.

DETAILED DESCRIPTION OF THE INVENTION

Figure 1:
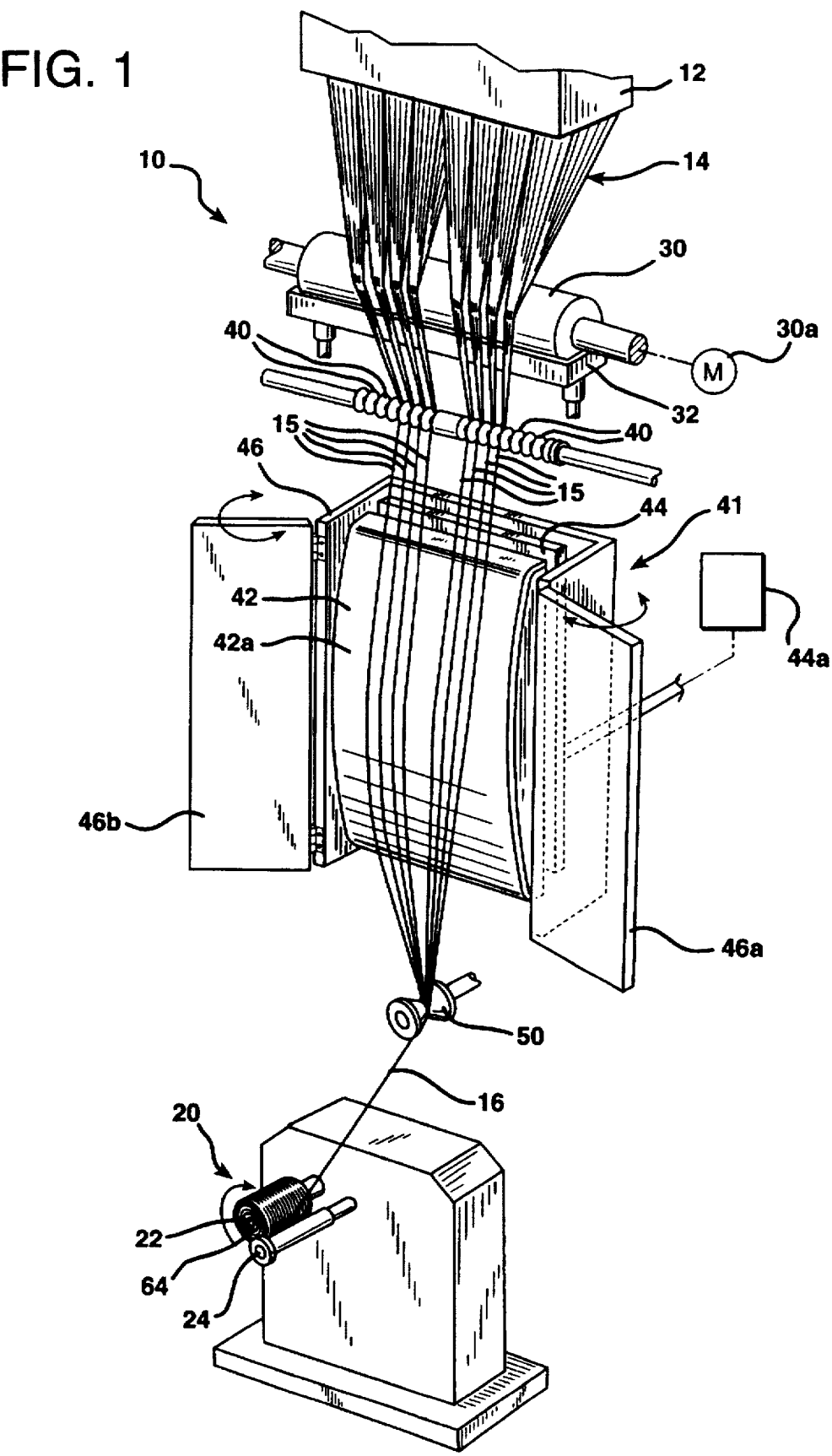
FIG. 1 is a perspective view of a glass fiber package forming apparatus constructed in accordance with a first embodiment of the present invention.

An apparatus for producing a glass fiber package in accordance with the present invention is shown in FIG. 1, and is generally designated by the reference numeral 10. The apparatus 10 comprises a bushing 12 having a number of orifices (not shown) through which a plurality of streams of molten glass are discharged. The orifices may be extended by hollow studs or tips (not shown). The streams of glass are mechanically drawn to form continuous fibers 14 via a winder device 20.

The fibers 14 pass over an applicator roller 30 which applies a liquid coating of sizing composition (also referred to herein as size) to the fibers 14. Sizing compositions are typically aqueous based, but may be of any other suitable type. A trough 32 containing the sizing composition is positioned below the roller 30. The roller 30 extends into the trough 32 and, as it is rotated by a conventional drive device 30a, transfers sizing composition from the trough 32 to the fibers 14. Other devices or techniques for applying size to the glass fibers 14 may be used in place of the applicator roller 30.

In the illustrated embodiment, the sized fibers 14 are split into discrete bundles 15 via primary or first shoes 40. The shoes 40 are formed from a ceramic material.

From the shoes 40, the fibers 14 pass over and contact a heating device 41. The heating device 41 comprises a first plate 42 (also referred to herein as a contact plate) having a curved outer surface 42a which is directly contacted by the fibers 14. A resistance-heated second plate 44, which is connected to a power supply 44a, is spaced a small distance from the first plate 42 and serves to radiantly heat the first plate 42. As the fibers 14 pass over the first plate 42, energy in the form of heat is transferred from the first plate 42 to the sized fibers 14. When an aqueous based size is employed, the heat transferred from the first plate 42 to the fibers 14 evaporates water from the size.

Figure 2:
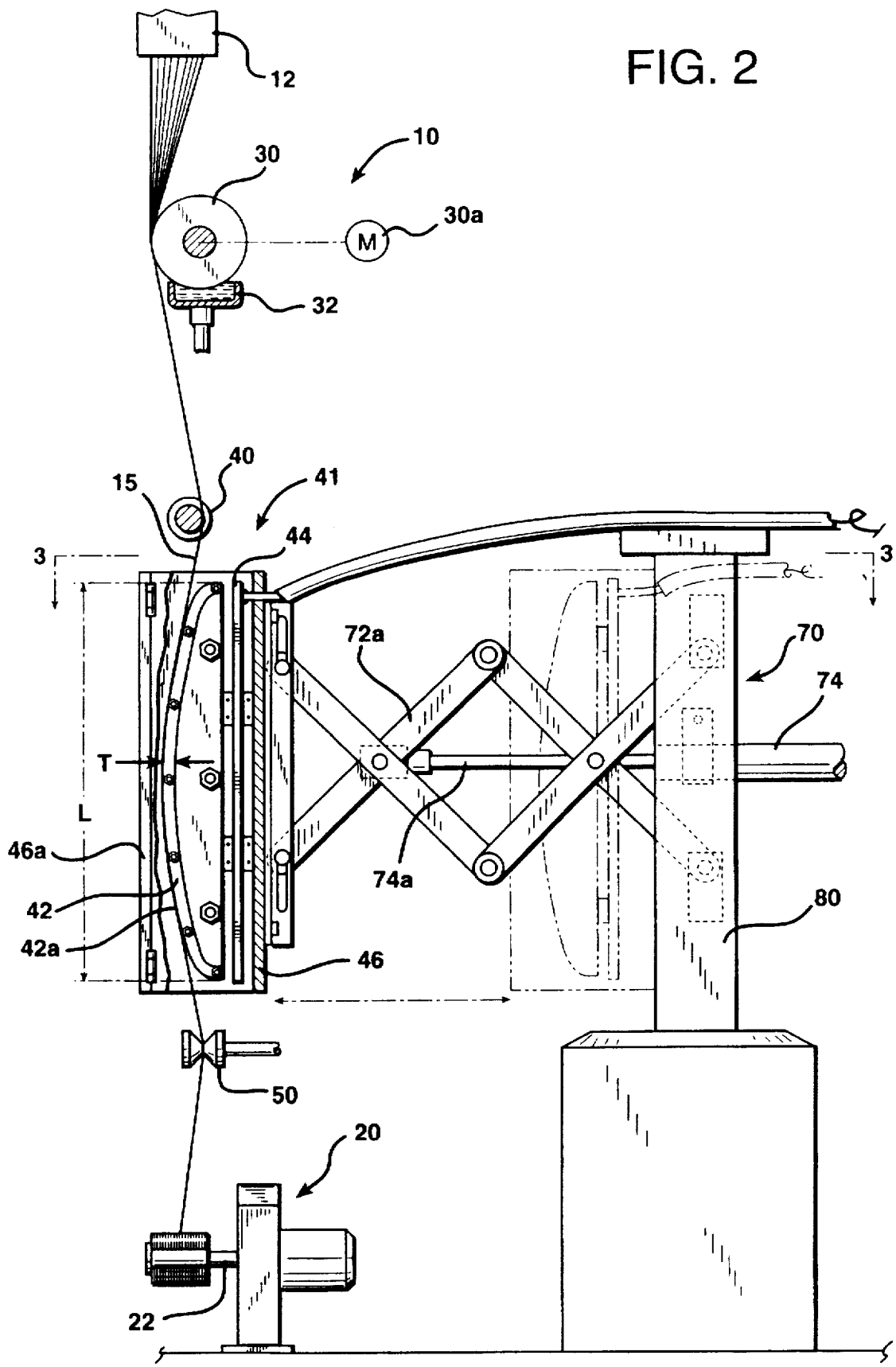
FIG. 2 is a side view of the apparatus illustrated in FIG. 1.

The first plate 42 may have a length L=15.0 inches, a thickness T=0.25 inch, and a radius of curvature equal to 50.0 inches, see FIG. 2. The plate 42 is formed from metal, such as stainless steel or copper. Preferably, the plate 42 is maintained at a temperature of between 1000° F. and 1500° F., and most preferably at a temperature of 1300° F.

In accordance with one embodiment of the present invention, the size comprises: water; a film former; one or more coupling agents, such as silane coupling agents which are commercially available from OSI Industries under the product names A1100 and A174; one or more lubricants such as a fatty acid ester which is commercially available from the Stepan Co. under the product name KESSCO BES, and an amine lubricant which is commercially available from the Henkel Corporation under the product name Emery 6760U; a wetting agent, an example of which is commercially available from Rhone-Poulenc under the product name Igepal CA630; an antistatic agent, an example of which is commercially available from PPG Specialty Chemical under the product name Larostat 264A; and an acetic acid. Preferably, the film former comprises a mixture of a crosslinking vinyl acrylic copolymer emulsion, which is commercially available from Franklin International under the product name Covinax 27A, a vinyl acetate copolymer emulsion, which is commercially available from Franklin International under the product name Duracet 1512, and a polyvinyl acetate copolymer latex, which is commercially available from Franklin International under the product name Duracet 675-01.

After passing over the first plate 42, the fiber bundles 15 are gathered together via a gathering shoe 50 to form a single tow 16. From the gathering shoe 50, the tow 16 is wound via the winder device 20, a type-30 winder device in the illustrated embodiment, onto a sleeve or tube 64, see FIGS. 1 and 5, to form a glass fiber package 60. The winder device 20 comprises a rotatable member or a collet 22, upon which is provided the removable tube 64. The winder device 20 also includes a conventional traversing mechanism 24 to distribute the tow 16 along the length of the tube 64 to form a square-edge package. By winding the tow 16 into a square-edge package, unacceptable catenary is substantially eliminated.

Figure 4:
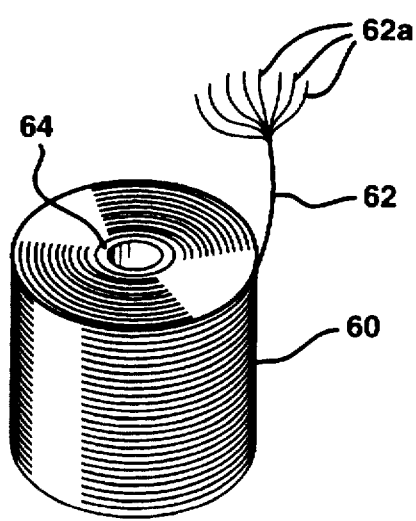
FIG. 4 is a perspective view of a glass fiber package formed in accordance with the present invention.

The glass fiber package 60 shown in FIG. 4 comprises a gun roving product. Strand 62 extending from the package 60 is separable into discrete bundles 62a. Each bundle 62a comprises a plurality of fibers which are adhered to one another via the film former applied by the applicator roller 30.

While a gun roving product is shown in the illustrated embodiment, it is further contemplated that other products may also be produced using the heating device 41. For example, a single-end product, such as a Process 30 product (a square-edge shippable forming product), may be formed using the heating device 41.

A sizing composition having a bis silane ingredient may be used, for example, to make that single-end product when using the heating device 41.

Bis silanes we use are represented by the formula:

$(R)_3Si\text{—}R^1\text{—}Si(R)_3$ wherein R is an alkyl or alkoxy radical having 1 to 10 carbon atoms and $R^1$ is an alkylene radical having 1 to 10 carbon atoms. Preferably R is an alkyl or alkoxy radical having 1 to 5 carbon atoms and $R^1$ is an alkylene radical having 1 to 5 carbon atoms.

Exemplary bis silanes are 1-(triethoxy silyl)-2-(methyldiethoxy silyl) ethane represented by the formula $(CH_3CH_2O)_3SiCH_2Si(CH_3)(OCH_2CH_3)_2$; and 1,2-bis(trimethoxy silyl) ethane represented by the formula:

$(CH_3O)_3SiCH_2Si(OCH_3)_3$

As shown, each R radical may be different.

The size composition also contains film forming epoxies, other silanes, lubricants, wetting agents and the like.

As used here, the term "film forming epoxy" is a diglycidyl ether or bisphenol A. The term also includes suitable surfactants or emulsifiers. It is best to employ commercially available film forming epoxy materials, and to also first form these epoxy materials into an emulsion for subsequent combination with the other ingredients of the size composition. The epoxy materials used in the size composition are diglycidyl ethers or bisphenol A, and are commercially available under such trade designations as AD 502 and NEOXIL 962. Such diglycidyl ethers have terminal unreacted epoxy groups and are generally of the formula:

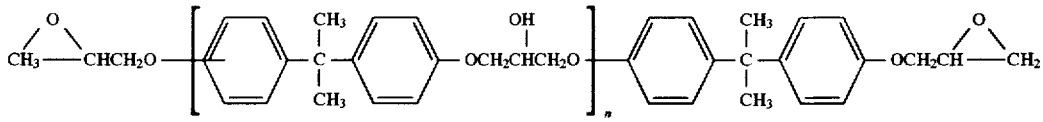

Exemplary ethers are low molecular weight materials in which n is a value between about 0.2 to about 0.34. These epoxy materials typically have epoxide equivalent weights of less than about 600, and suitably about 540 to about 170. In the preferred embodiment of this invention, we employ two epoxy emulsions.

While any methylacryloxysilane may be employed, the preferred material is gamma-methacryloxypropyltrimethoxysilane such as that commercially available under the trade designation A-174.

A wide variety of lubricants may be used, but a silicone lubricant is preferred.

The wetting agent, an acid and water make up the balance of the size composition. We apply the size compositions in an acidic aqueous emulsion form. The preferred acid for pH adjustment is acetic acid. The above ingredients will constitute about 5 to about 10 percent by weight of the final applied size emulsion, with the balance being the acid and water.

The amount of each ingredient in the size is not critical. Exemplary amounts are:

| Ingredient | Percent by Weight as Received |
|---|---|
| Epoxy Film Former | 5.0 to 10.0 |
| Methylacryloxysilane | 1.0 to 3.0 |
| Bis-Silane | 0.2 to 1.0 |
| Lubricant | 0 to 1.0 |
| Wetting Agent | 0 to 0.5 |
| Acid | 0 to 0.5 |
| Deionized Water | balance |

Preferably these amounts are:

| Ingredient | Percent by Weight as Received |
|---|---|
| Epoxy | 5.0 to 7.5 |
| Silane | 1.0 to 2.0 |
| Bis-Silane | 0.3 to 0.8 |
| Lubricant | 0 to 0.7 |
| Wetting Agent | 0 to 0.3 |
| Acid | 0 to 0.3 |
| Deionized Water | Balance |

This size is an acqueous based size containing up to 10% solids with the balance being water.

The following exemplary size formulation was prepared for vinyl ester filament winding:

| Size Formulation | % by wt as received |
|---|---|
| AD-502 (epoxy emulsion) | 4.26 |
| NEOXIL 962 (epoxy emulsion) | 2.00 |
| A-174 silane | 1.68 |
| Y-11620 (bis-silane) | 0.55 |
| SM-2154 (silicone lubricant) | 0.50 |
| SILWET L-77 (Wetting agent) | 0.10 |
| Acetic acid | 0.20 |
| Deionized water | balance |

The size was an aqueous based size containing about 95% water and about 5% solids.

Other products that may be formed using the heating device 41 include: panel roving; yarn; glass fiber products for use in bulk molding compound products, sheet molding compound products, and glass fiber reinforced thermoplastic products; and other like products.

It is also contemplated that the apparatus 10 may be used to produce glass fiber packages which are only partially dry when wound onto a tube 64. Partially drying the size applied to glass fibers, e.g., such that the package mixture content is below 6%, is believed to reduce migration in the resulting glass fiber package.

It is further contemplated that two separate glass fiber packages may be formed simultaneously using an apparatus employing the heating device 41. As such, the two packages would be positioned side-by-side at the winder station.

Figure 3:
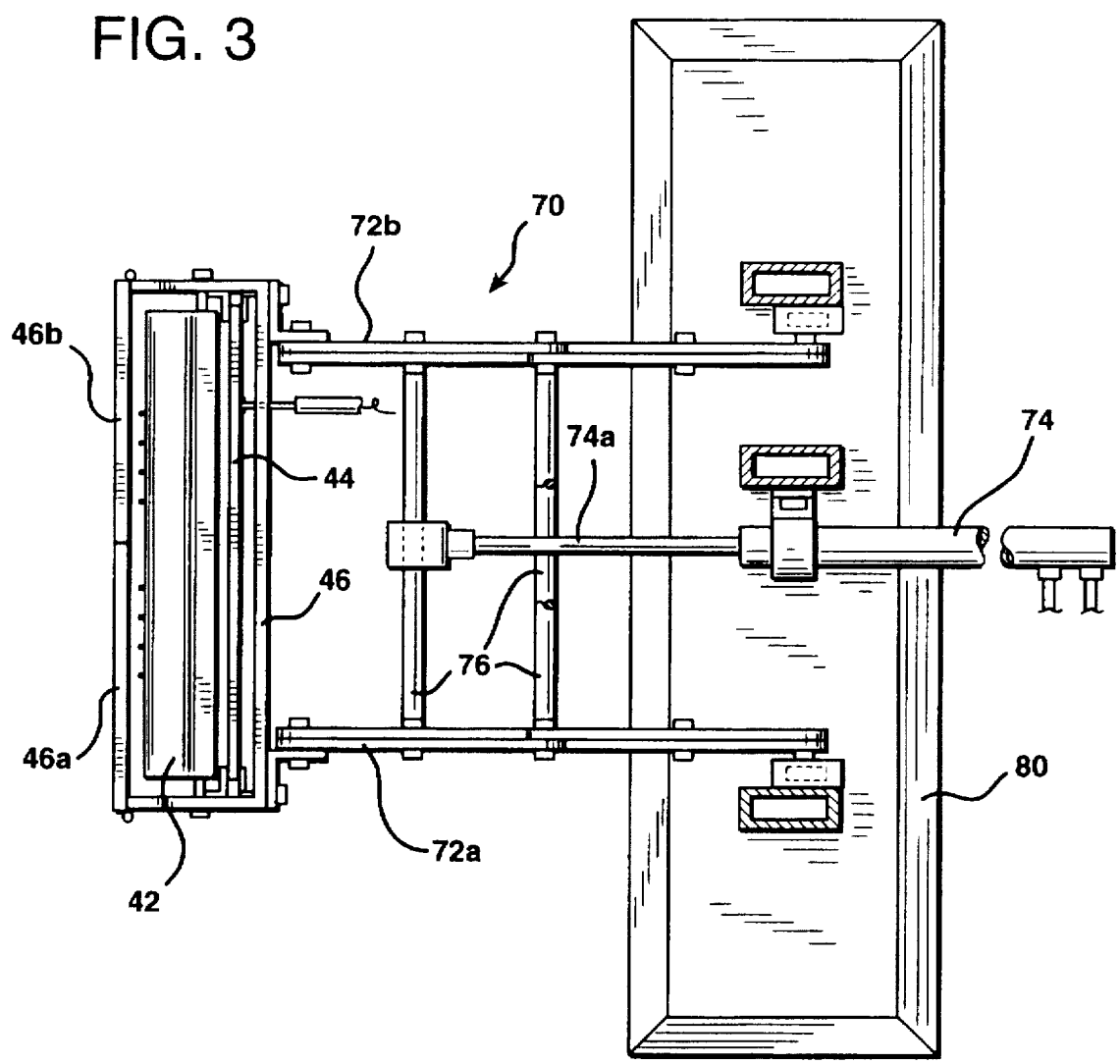
FIG. 3 is a view taken along view line 3—3 in FIG. 2.

Referring again to FIGS. 1–3, the first and second plates 42 and 44 are housed within a cabinet 46, which is moveable toward and away from the fibers 14. The cabinet 46 includes first and second doors 46a and 46b which, when closed, serve as heat shields. The doors 46a and 46b are preferably formed from insulation board, such as 1 inch thick calcium silicate.

A reciprocating device 70 is provided for moving the cabinet 46 toward and away from the fibers 14. The device 70 comprises first and second linkage mechanisms 72a and 72b and a piston-cylinder drive unit 74. The linkage mechanisms 72a and 72b are connected to the cabinet 46 and to a support 80. The piston-cylinder drive unit 74 extends from the support 80 and is fixedly connected to one of a plurality of support members 76 extending between the first and second linkage mechanisms 72a and 72b, see FIG. 3. Reciprocating movement of the piston 74a of the drive unit 74 effects movement of the cabinet 46 and, hence, the first plate 42.

Figure 5:
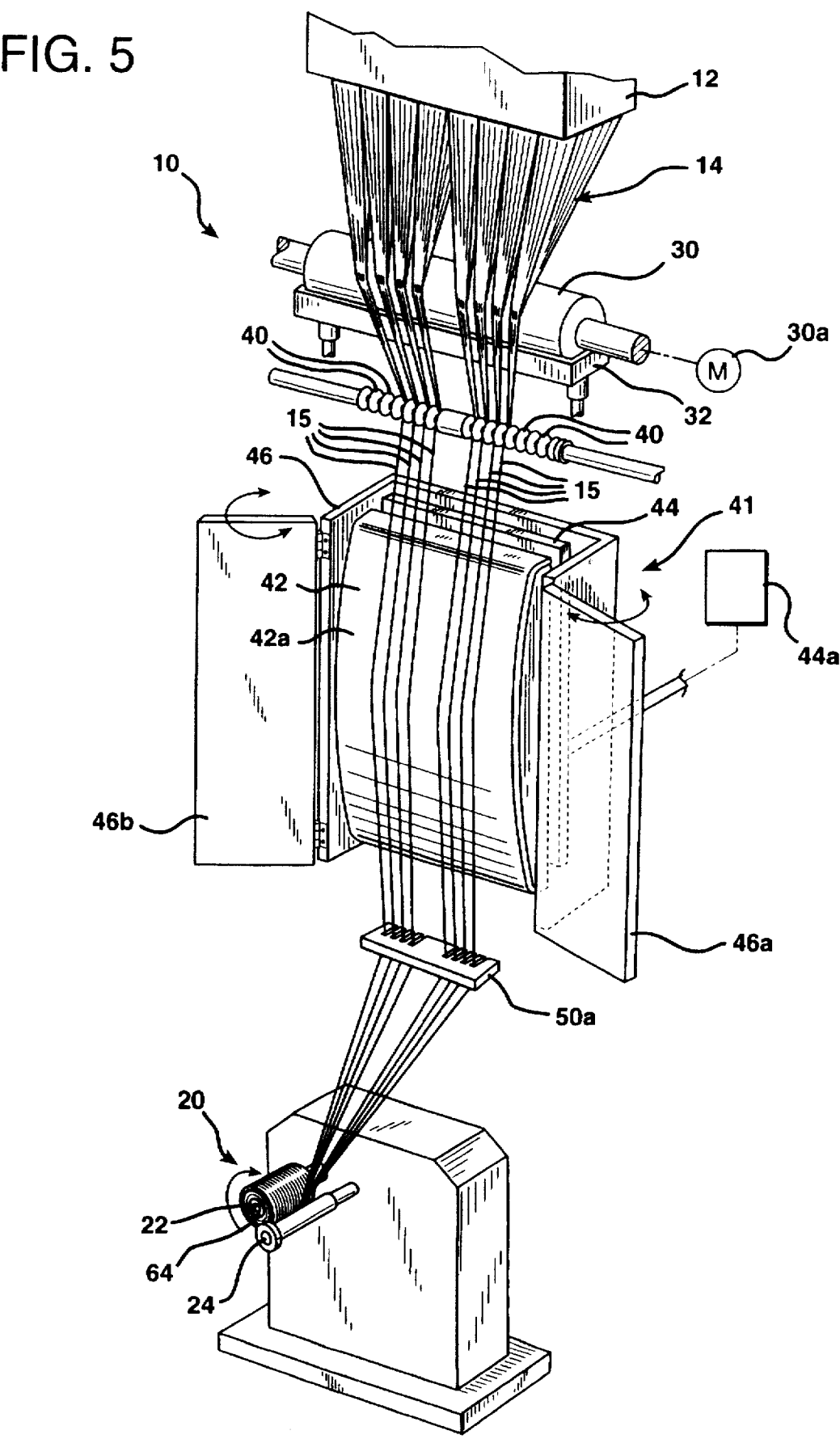
FIG. 5 is a perspective view of a glass fiber package forming apparatus constructed in accordance with a second embodiment of the present invention.

In an alternative embodiment shown in FIG. 5, where like reference numerals indicate like elements, a separating shoe 50a is used in place of the gathering shoe 50 shown in FIG. 1. In this embodiment, the spacing between the bundles 15 is maintained until the bundles 15 are gathered together at the winding device 20.

The following example is given to illustrate certain preferred details of the invention, it being understood that the details of the example are not to be taken as in any way limiting the invention thereto.

EXAMPLE 1

A multiple split gun roving product was made using the apparatus illustrated in FIG. 5. The bushing 12 included 2000 openings and was operated at a 33 lb/hour glass throughput rate. The 2000 fibers were separated into 8 bundles, with each bundle having 250 fibers. The size included on a percent by weight as received basis the following: 12.80% of a vinyl acetate copolymer emulsion, which is commercially available from Franklin International under the product name Duracet 1512; 2.13% of a polyvinyl acetate copolymer latex, which is commercially available from Franklin International under the product name Duracet 675-01; 2.13% of a vinyl acrylic copolymer emulsion, which is commercially available from Franklin International under the product name Covinax 27A; 0.18% of an antistatic agent, which is commercially available from PPG Specialty Chemical under the product name Larostat 264A; 0.012% of an amine lubricant, which is commercially available from Henkel Corporation under the product name Emery 6760U; 0.037% of a wetting agent which is commercially available from Rhone-Poulenc under the product name Igepal CA630; 0.16% of a silane coupling agent which is commercially available from OSI Industries under the product name A1100; 0.20% of a silane coupling agent which is commercially available from OSI Industries under the product name A174; 1.52% of a fatty acid ester lubricant which is commercially available from Stepan Company under the product name KESSCO BES; 0.10% of an acetic acid; and 80.73% deionized water. The total solids content of the sizing composition was about 9.4 weight percent. The first plate was maintained at a temperature of approximately 1300° F.

A gun roving product was produced having a tow separable into 8 bundles or strands. No evidence of migration was found in the resultant product.

With the present invention, an in-line drying process is provided which provides a number of advantages not previously found in the prior art. For example, the present invention reduces or substantially eliminates size migration in glass fiber packages and the resultant discoloration. The present invention also allows split products to be produced with reduced catenary. The present invention further permits glass fiber packages to be produced more efficiently and at lower costs.

Having described the invention in detail and by reference to preferred embodiments thereof, it will be apparent that modifications and variations are possible without departing from the scope of the invention defined in the appended claims.

We claim:

1. A method for applying size to glass fibers comprising the steps of:

applying a size to said fibers to form sized fibers; and contacting said sized fibers with a heated member maintained at a temperature of between about 1000° F. and 1500° F. to effect drying of said size on said fibers, said member being stationary while contacting said sized fibers.

2. A method as set forth in claim 1, wherein an aqueous based size is applied to said fibers and said heated member causes at least a portion of the water in the aqueous based size to evaporate.

3. A method for producing a plurality of sized glass fibers comprising the steps of:

drawing a plurality of glass fibers from a source of molten glass;

applying a size to said fibers to form sized fibers; and contacting said sized fibers with a heated member maintained at a temperature of between about 1000° F. and 1500° F. to effect drying of said size on said fibers, said heated member being stationary while contacting said sized fibers.

4. A method as set forth in claim 3, further comprising the step of separating said sized fibers into a plurality of bundles before said fibers contact said heated member.

5. A method as set forth in claim 3, wherein an aqueous based size is applied to said fibers and said heated member causes at least a portion of the water in the aqueous based size to evaporate.

6. A method as set forth in claim 3, wherein said size comprises a film former selected from the group consisting of a vinyl acrylic copolymer emulsion, a vinyl acetate copolymer emulsion, a polyvinyl acetate copolymer latex, and mixtures thereof.

7. A method for producing a glass fiber package having a plurality of separable bundles comprising the steps of:

drawing a plurality of glass fibers from a source of molten glass;

applying a size to said fibers to form sized fibers;

separating said sized fibers into a plurality of bundles;

contacting said sized fibers with a heated member maintained at a temperature of between about 1000° F. and 1500° F. to transfer energy in the form of heat from said heated member to said fibers to dry said size on said fibers, said heated member being stationary while contacting said sized fibers; and, winding said individual bundles into a package.

8. A method as set forth in claim 7, wherein an aqueous based size is applied to said fibers and said heated member causes at least a portion of the water in the aqueous based size to evaporate.

9. A method as set forth in claim 7, wherein said size comprises a film former selected from the group consisting of a vinyl acrylic copolymer emulsion, a vinyl acetate copolymer emulsion, a polyvinyl acetate copolymer latex, and mixtures thereof.

10. Apparatus for applying size to glass fibers comprising:

an applicator for applying a size to said fibers to form sized fibers; and, a drying device comprising a heated element maintained at a temperature of between about 1000° F. and 1500° F. for contacting and transferring energy in the form of heat to said sized fibers to dry said size on said fibers, wherein said heated element is stationary while contacting said sized fibers.

11. Apparatus as set forth in claim 10, wherein said heated element comprises a heated contact plate.

12. Apparatus as set forth in claim 11, wherein said heated contact plate has a cruved outer surface which is adapted to directly contact said fibers.

13. Apparatus as set forth in claim 10, wherein said heated element comprises a contact plate for directly engaging said fibers and said drying device further comprises an energy source for generating and transferring energy in the form of heat to said contact plate to heat said contact plate.

14. An apparatus for producing a glass fiber package comprising:

a heated bushing for supplying streams of molten glass to be drawn into continuous fibers;

a rotatable member adapted to draw said streams into said fibers and to wind said fibers into a package;

an applicator for applying a size to said fibers to form sized fibers; and, a drying device comprising a heated element maintained at a temperature of between about 1000° F. and 1500° F. for contacting and transferring energy in the form of heat to said sized fibers to dry said fibers before they are wound into said package, wherein said heated element is stationary while contacting said sized fibers.

15. An apparatus as set forth in claim 14, wherein said heated element comprises a heated contact plate.

16. An apparatus as set forth in claim 15, wherein said heated contact plate has a curved outer surface which is adapted to directly contact said fibers.

17. An apparatus as set forth in claim 14, wherein said heated element comprises a contact plate for directly engaging said fibers and said drying device further comprises an energy source for generating and transferring energy in the form of heat to said contact plate to heat said contact plate.

18. An apparatus as set forth in claim 17, wherein said energy source comprises a resistance heater spaced a predetermined distance from said contact plate for radiantly heating said contact plate.

19. An apparatus as set forth in claim 14, further comprising a shoe located between said applicator and said drying device for separating said fibers into two or more bundles.

20. An apparatus as set forth in claim 19, further comprising a gathering shoe located between said drying device and said rotatable member for collecting said fibers into a strand.

21. An apparatus as set forth in claim 14, further comprising a shoe located between said drying device and said rotatable member for separating said fibers into two or more bundles.

* * * * *